J. F. KINGWILL.
DRIVE-CHAIN.
No. 190,147.
Patented May 1, 1877.
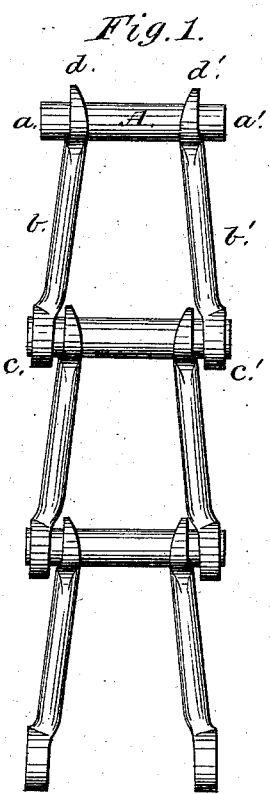
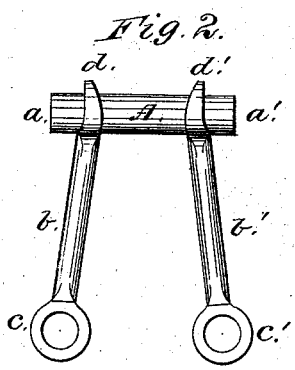
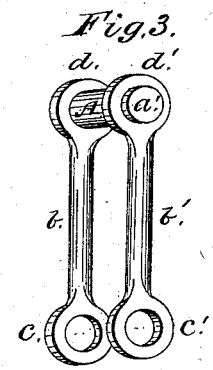
Witnesses:
Inventor:
John F. Kingwill

UNITED STATES PATENT OFFICE.

JOHN F. KINGWILL, OF CHICAGO, ILLINOIS.

IMPROVEMENT IN DRIVE-CHAINS.

Specification forming part of Letters Patent No. 190,147, dated May 1, 1877; application filed May 1, 1876.

*To all whom it may concern:*

Be it known that I, JOHN F. KINGWILL, of Chicago, in the county of Cook and State of Illinois, have invented certain new and useful Improvements in Driving-Chains; and I do hereby declare the following to be a full, clear, and exact description thereof, reference being had to the accompanying drawing, and to the letters of reference marked thereon.

My invention relates to chains for driving machinery and for other purposes; and it consists in a link for a flat chain composed of two draw-bars, provided with eyes or hooks, and a cross-bar having ends projecting beyond the draw-bars, all being cast in one piece, and constructed substantially in the manner hereinafter more fully set forth.

In order to enable others skilled in the art to which my invention appertains to make and use the same, I will now proceed to describe its construction and operation, referring to the annexed drawing, which forms a part of this specification, and in which—

Figure 1 represents three links of the chain completed and attached. Fig. 2 represents a single link as first made. Fig. 3 is a perspective view of a single link, ready to be connected to other links.

A represents a round cross-bar of any suitable dimensions and cast with two draw-bars, $b$ $b'$, which have at their outer ends eyes or hooks $c$ $c'$, respectively. At the points where these draw-bars project from the cross-bar A are formed flanges $d$ $d'$, which strengthen the chain and prevent the cogs or sprockets on the drive pulley or sheave from pressing against the ends of the draw-bars of the next link and forcing them out of place. These flanges also render the spaces on the upper and lower sides of the cross-bar equal, and improve the appearance of the chain.

The cross-bar A extends beyond the draw-bars $b$ $b'$, forming the projecting ends $a$ $a'$, as shown.

The eyes or hooks $c$ $c'$ at the ends of the draw-bars are cast, as shown in Fig. 2, to avoid coring the eyes, and the draw-bars are then twisted, by any suitable means, so as to bring the eyes $c$ $c'$ at right angles with their original position, as shown in Fig. 3.

By spreading the ends of the draw-bars $b$ $b'$ slightly apart the eyes or hooks $c$ $c'$ may be slipped over and upon the projecting ends $a$ $a'$ of the cross-bar A of the next link, thus forming the chain, as represented in Fig. 1.

It will be noticed that the ends or eyes of the draw-bars in a chain thus constructed are thrown outside of the line of draft, and that the tendency of the draft is to draw them together, thus binding the chain more firmly.

If desired, the draw-bars $b$ $b'$ may be cast separate from the cross-bar A, the flanges $d$ $d'$ then being in the form of eyes, to be placed on and fastened to the cross-bar.

Having thus fully described my invention, what I claim as new, and desire to secure by Letters Patent, is—

A link for a flat chain, cast in one piece and consisting of the cross-bar A, with flanges $d$ $d'$ and projecting ends $a$ $a'$, and the draw-bars $b$ $b'$, eyes or hooks $c$ $c'$ at their inner ends, formed as described, to adapt them to receive the projecting ends of an adjacent link, substantially as and for the purpose set forth.

JOHN F. KINGWILL.

Witnesses:
 CHARLES. W. DEERING,
 WM. D. PORTER.